United States Patent
Golovchinsky et al.

(10) Patent No.: US 6,529,215 B2
(45) Date of Patent: Mar. 4, 2003

(54) METHOD AND APPARATUS FOR ANNOTATING WIDGETS

(75) Inventors: Gene Golovchinsky, Palo Alto, CA (US); William N. Schilit, Menlo Park, CA (US); Morgan N. Price, Palo Alto, CA (US)

(73) Assignees: Fuji Xerox Co., Ltd., Tokyo (JP); Xerox Corporation, Stamford, CT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/224,708

(22) Filed: Dec. 31, 1998

(65) Prior Publication Data

US 2002/0083094 A1 Jun. 27, 2002

(51) Int. Cl.[7] .................................................. G09G 5/00
(52) U.S. Cl. ........................ 345/764; 345/700; 715/512
(58) Field of Search ............................... 345/339, 326, 345/340, 764, 700, 781, 751, 753, 759; 707/512; 715/512

(56) References Cited

U.S. PATENT DOCUMENTS

| | | | | |
|---|---|---|---|---|
| 5,524,193 A | * | 6/1996 | Covington et al. | 707/512 |
| 5,577,188 A | * | 11/1996 | Zhu | 345/326 |
| 5,596,700 A | * | 1/1997 | Darnell et al. | 345/340 |
| 5,689,717 A | * | 11/1997 | Pritt | 709/512 |
| 5,768,607 A | * | 6/1998 | Drews et al. | 707/512 |
| 6,081,829 A | * | 6/2000 | Sidana | 709/203 |

OTHER PUBLICATIONS

Lynn D. Wilcox et al., "Dynomite: A Dynamically Organized Ink and Audio Notebook," CHI 97 Conference Proceedings, ACM Press, 1997, pp. 186–193.
Bill N. Schilit et al., "Beyond Paper, Supporting Active Reading With Free Form Digital Ink Annotations," Proceedings of CHI 98 Human Factors in Computing Systems, ACM Press, 1998.
Ellen Francik, "Rapid Integrated Design of a Multimedia Communication System," Human–Computer Interface Design, pp. 36–69, 1996.
Thomas P. Moran et al., "Pen–Based Interaction Techniques for Organizing Material on an Electronic Whiteboard," UIST 97 (Banff, Alberta, Canada, ACM Press), pp. 45–54, 1997.
Robert Carr et al., "The Power of Penpoint," Addison–Wesley Publishing Company, Inc., pp. 229–231.
James A. Landay, "Interactive Sketching for the Early Stages of User Interface Design," Ph.D. Dissertation, Report #CMU–HCII–96–105, Computer Science Department Carnegie Mellon University, Pittsburgh, PA, Dec. 1996.
"Chapter 1—Introduction to Apple Guide", Apple Computer, Inc., http://developer.apple.com/techpubs/mac/AppleGuide/AppleGuide–11.html, Jul. 1996.
Streitz, N. et al., DOLPHIN: Integrated Meeting Support Across LiveBoards, Local and Remote Desktop Environments, Proceedings of the ACM 1994 Conference on Computer–Supported Cooperative Work (CSCW94), Oct. 1994.
"Electronic Posted Notes", IBM Technical Disclosure Bulletin, US, IBM Corp. New York, vol. 37, No. 1, 1994, pp. 121–122.

* cited by examiner

*Primary Examiner*—Sy D. Luu

(57) ABSTRACT

Widgets are annotated with freeform digital ink. Rather than annotating the data displayed by widgets, annotations are made "on" the widgets themselves and stored in relation to the application and/or window they are associated with. These annotations allow users to interact with widgets without having to keep a separate hardcopy set of notes or instructions explaining how to use the widgets.

29 Claims, 18 Drawing Sheets

METHOD AND APPARATUS FOR ANNOTATING WIDGETS

BACKGROUND OF THE INVENTION

1. Field of Invention

This invention is related to annotating widgets of a graphical user interface. In particular, this invention is directed to a system and method of annotating widgets to facilitate a user's learning to use a graphical user interface.

2. Description of Related Art

Complex graphical user interfaces that contain windows, such as collections of menus, dialog boxes and toolbars found in everyday software applications, can be hard to learn. Users must often invoke long, precise sequences of commands or dialog box interactions to accomplish a desired task. Although on-line help manuals are commonly available, on-line help manuals often fail to clarify the problem at hand, and usually require several interactions before the desired information is obtained. While users can usually determine the correct sequence of actions through trial and error, infrequently-used command sequences are often forgotten and thus must be subsequently relearned every time they are required. Furthermore, beginners often keep long sequences of notes which correlate to and supplement actions to be performed in a given software application. However, because these notes are separate from, and not particularly well-linked to, the software application, these hardcopy notes are frequently extremely burdensome to use.

The APPLE GUIDE system is a mechanism in the computer's help system for showing a user how to accomplish specific tasks with widgets. Specifically, to explain some feature of the interface, highlights and ink marks are used to mark widgets. However, these highlights only exist during the help animation. The freeform digital ink marks cannot be created or manipulated by the user, nor are they available outside the help system.

SUMMARY OF THE INVENTION

Widgets are seen throughout today's software applications. Widgets, being placeholders for all controls in an interface, can range from windows in a graphical user interface, to simple dropdown menus, to buttons in a toolbar, to highly complex multi-level widgets that control complex functions or enable a user to select multiple options for a given application. Tracking a user's path through the maze of interfaces to achieve a desired result has become cumbersome.

This invention provides systems and methods for annotating widgets.

This invention separately provides systems and methods that allow a user to select an annotation mode, and with freeform digital ink, to record comments or notes directly on widgets.

This invention separately provides systems and methods that allow audio data to be associated with a widget and to be played by a user to, for example, direct the user how a particular function should be performed.

This invention separately provides systems and methods that allow a user to attach video data to a widget and to play back the video data to further facilitate performing a particular function.

This invention separately provides systems and methods that allow a user to annotate widgets with ASCII text.

This invention separately provides systems and methods for attaching annotations to a widget that can then be shared with other users.

In traditional freeform digital ink interfaces, annotations occur "inside" the widgets, rather than "on" the widgets. The methods and systems of this invention differ because, in the systems and methods of this invention, an annotation, e.g., freeform digital ink, is not treated as user data, e.g., a signature field, or as an annotation on user data, but rather as a method of associating comment, instructions or other annotations with the user interface. While freeform ink has been used to create content and to annotate documents, it has not been used to annotate user interface widgets. In Interactive Sketching for the Early Stages of User Interface Design, James A. Landay, Ph.D. dissertation, Report # CMU-CS-96-201, Computer Science Department, Carnagie Mellon University, Pittsburgh, Pa., December 26, freeform digital ink is used to add widgets to user interface prototypes, rather than to annotate existing widgets. Specifically, the prototype widgets are the added content. In contrast, the systems and methods of this invention allow for annotating of existing widgets themselves. Furthermore, U.S. Patent Application Ser. No. 09/222,962 herein incorporated by reference in its entirety, provides methods and systems for maintaining freeform ink annotations on changing views.

According to methods and apparatus of this invention, a user can directly annotate a widget with freeform graphical ink. Specifically, the user's annotations are recorded directly on widgets, without.affecting their functionality.

These and other features and advantages of this invention are described in or are apparent from the following detailed description of the preferred embodiments.

BRIEF DESCRIPTION OF THE DRAWINGS

The preferred embodiments of this invention will be described in detail, with reference to the following figures, wherein.

DETAILED DESCRIPTION OF PREFERRED EMBODIMENTS

Figure 1:
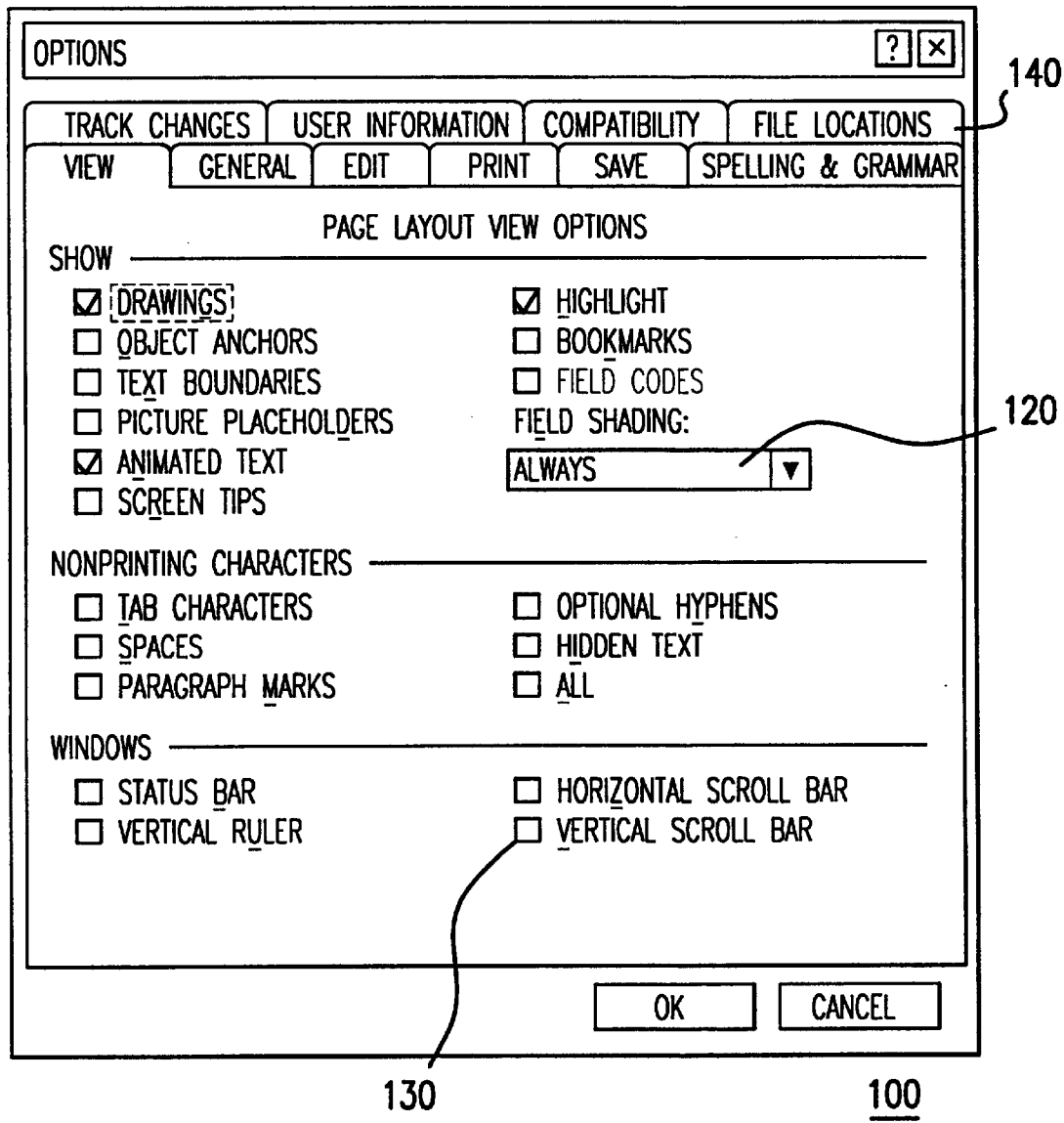
FIG. 1 shows an exemplary window comprising a number of widgets.
Figure 2:
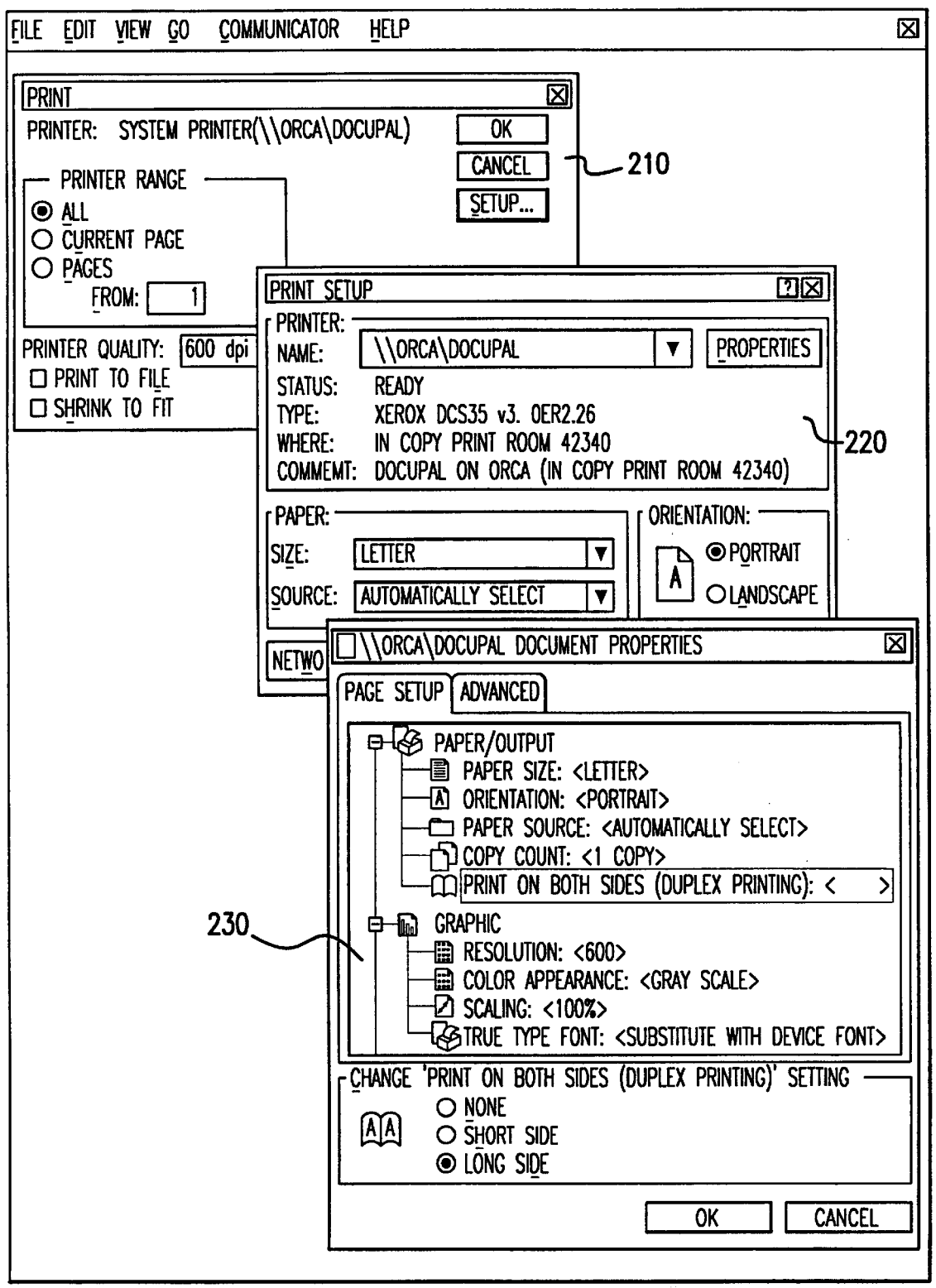
FIG. 2 shows an exemplary set of multi-level windows.

To annotate widgets, the systems and methods of this invention associate and store a user's annotations corresponding to one or more particular widgets. FIG. 1 is an exemplary window 100 of a graphical user interface. Common elements, i.e. widgets, within a window are dropdown menus 120, checkboxes 130, and tabs 140. Widgets within the window, such as the widgets shown in FIG. 1, are used to specify certain criteria of a desired or selected function. Although the window 100 shown in FIG. 1 is a simple example, windows can become highly complicated and contain hundreds of widgets corresponding to control options. FIG. 2 illustrates an exemplary multi-leveled window containing a first level window 210, a second level window 220 and a third level window 230. Clearly, with the quantity of information provided to a user in this context, it would be easy for the user to forget to or be unable to recognize the desired function.

Figure 3:
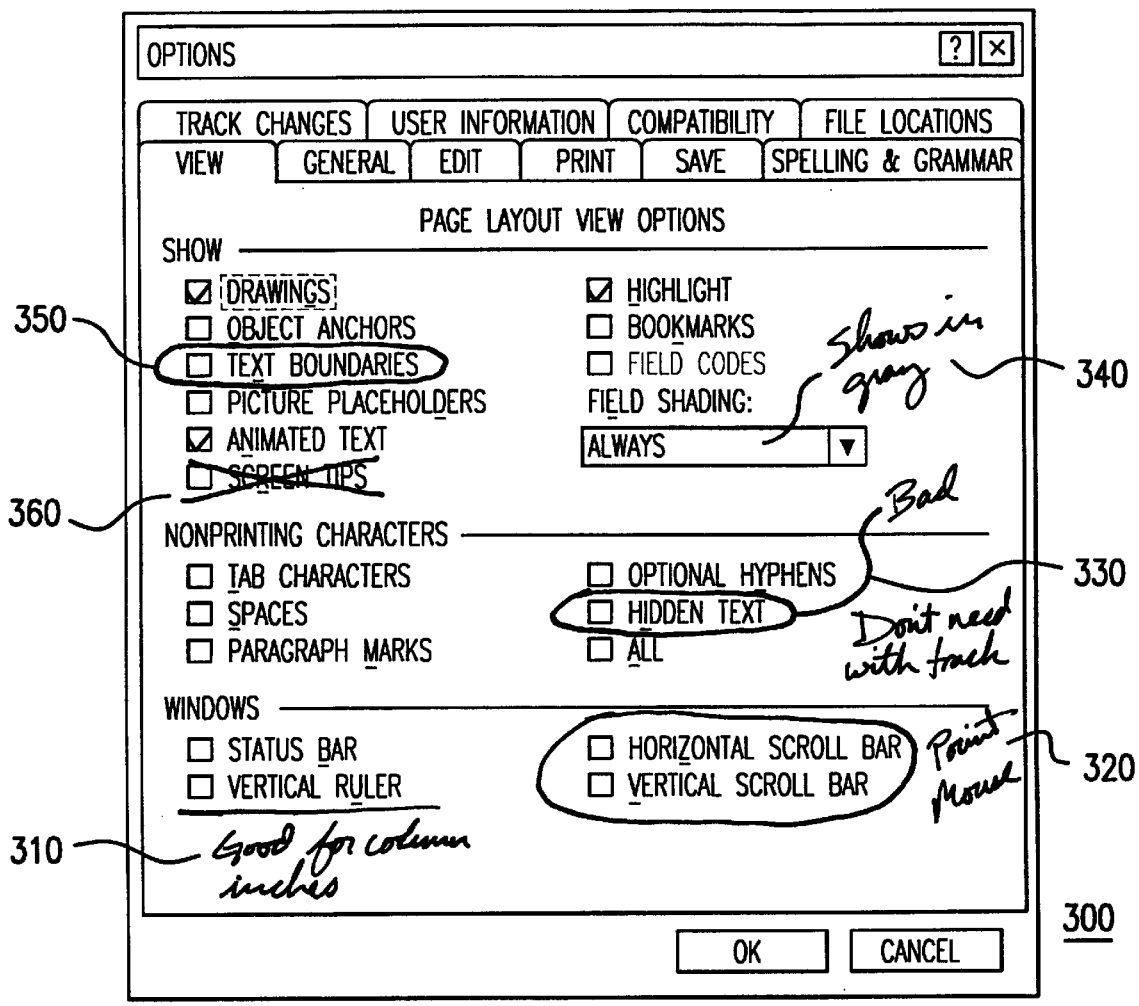
FIG. 3 shows a widget annotated according to this invention.

The systems and methods of this invention provide for annotating these widgets, as shown in FIG. 3. Specifically, the annotated window 300 of FIG. 3 is an annotated version of the window 100 illustrated in FIG. 1. By way of example, the user has indicated in an annotation 310 added to in the window 300 that the vertical ruler is "good for column inches," and in an annotation 320 that certain scrollbars are not needed for the SCROLLPOINT mouse. Other annotations 330–360 have been added to the widget 300 to provide additional information about the widget 300 to the user.

Figure 4:
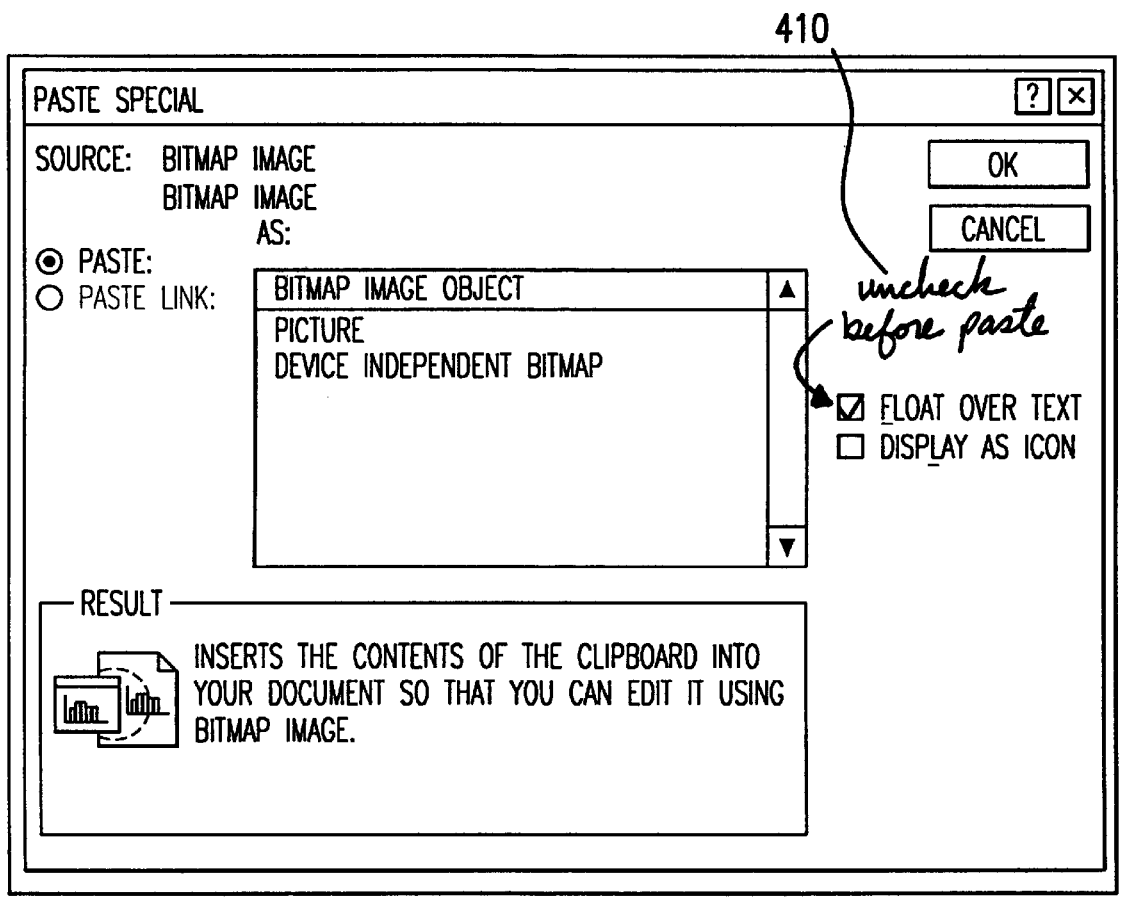
FIG. 4 is an exemplary widget demonstrating annotations made according to this invention.

FIG. 4 is an exemplary window 400 which contains an annotation 410 that indicates a course of action to be taken before a particular function is performed.

Figure 5:
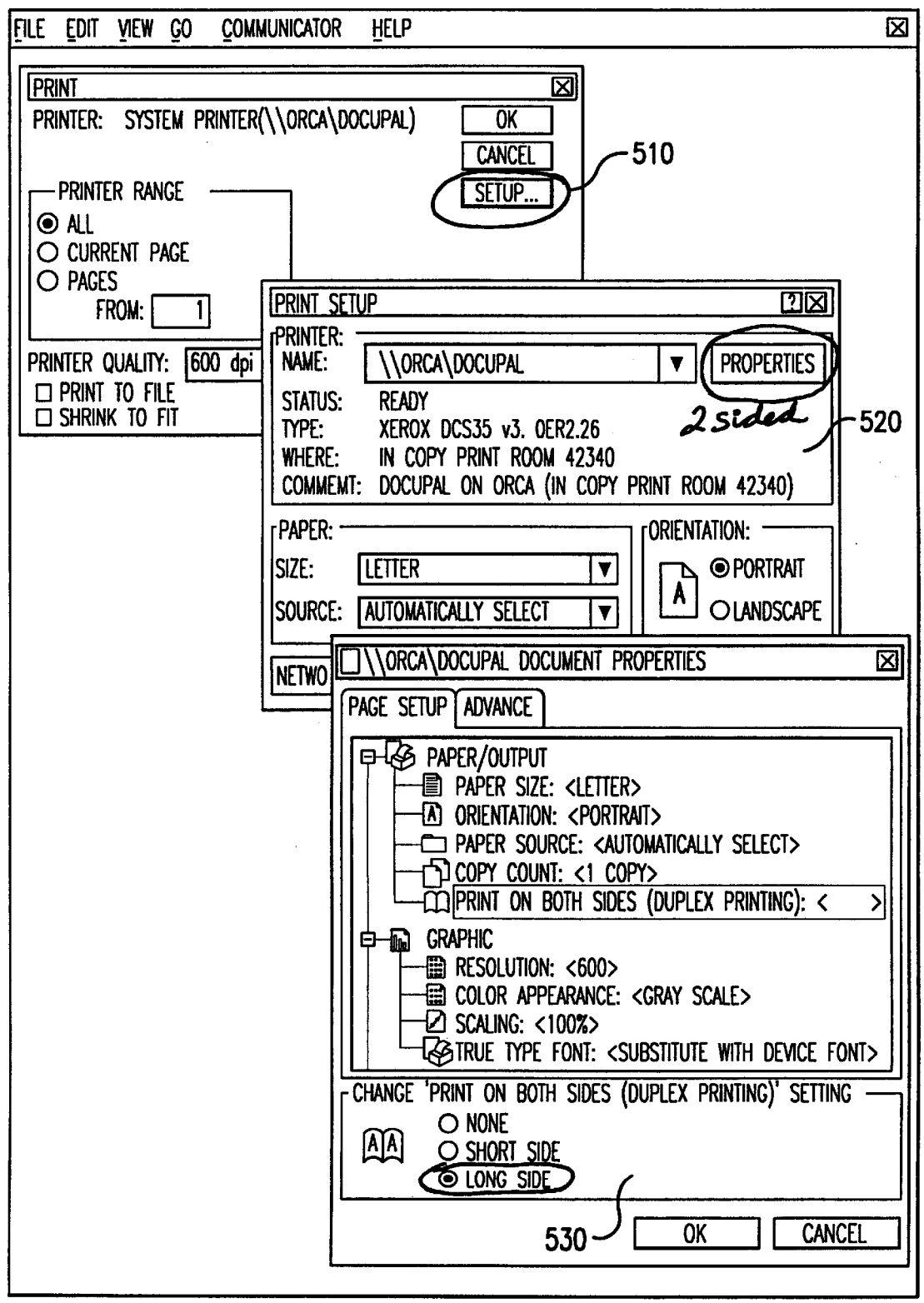
FIG. 5 is an exemplary set of annotated widgets corresponding to the unannotated widgets shown in FIG. 2 annotated according to this invention.

FIG. 5 is an exemplary cascaded set of multi-level windows 500, comprising windows 510–530 which have been annotated to direct a user through sequential events. Specifically, when a certain feature of the first level window 510 is selected, the subsequent window 520 is displayed. Again the user is directed via annotations added to the window 520 to a particular location within the window 520. Upon selecting a function within the annotated window 520, the user can then be directed to the annotated or highlighted function in the window 530.

Figure 6:
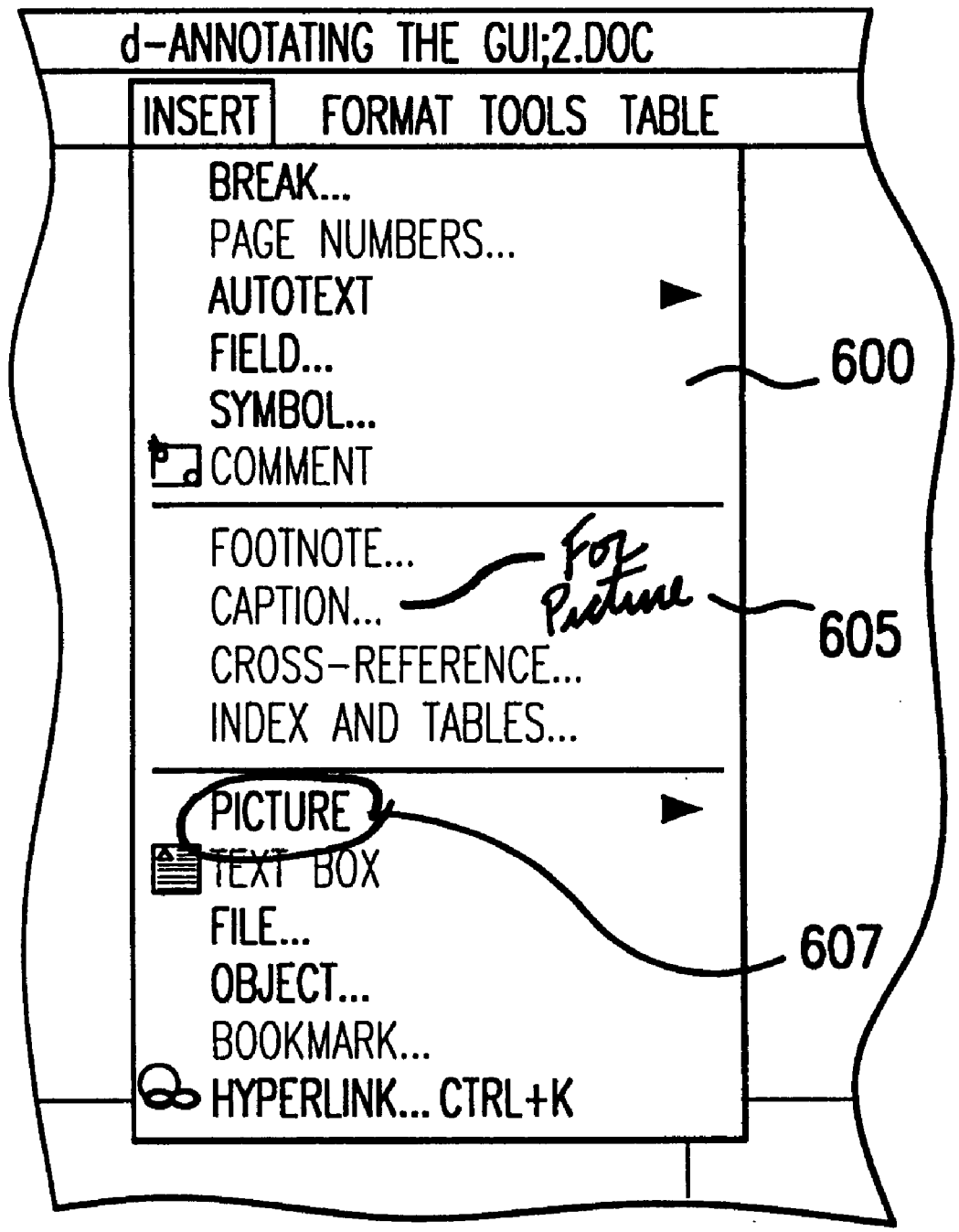
FIG. 6 shows an exemplary dropdown menu annotated according to this invention.

FIG. 6 illustrates an annotated dropdown menu 600. Specifically, the annotation 607 illustrates the circled menu item should be selected for insertion of a picture. Annotation 605 highlights that "caption" adds a caption to an inserted picture. Through the above examples, it is clear that the annotations added according to this invention are not limited to any particular type of window or graphical user interface, but rather are applicable to all widgets.

Figure 7:
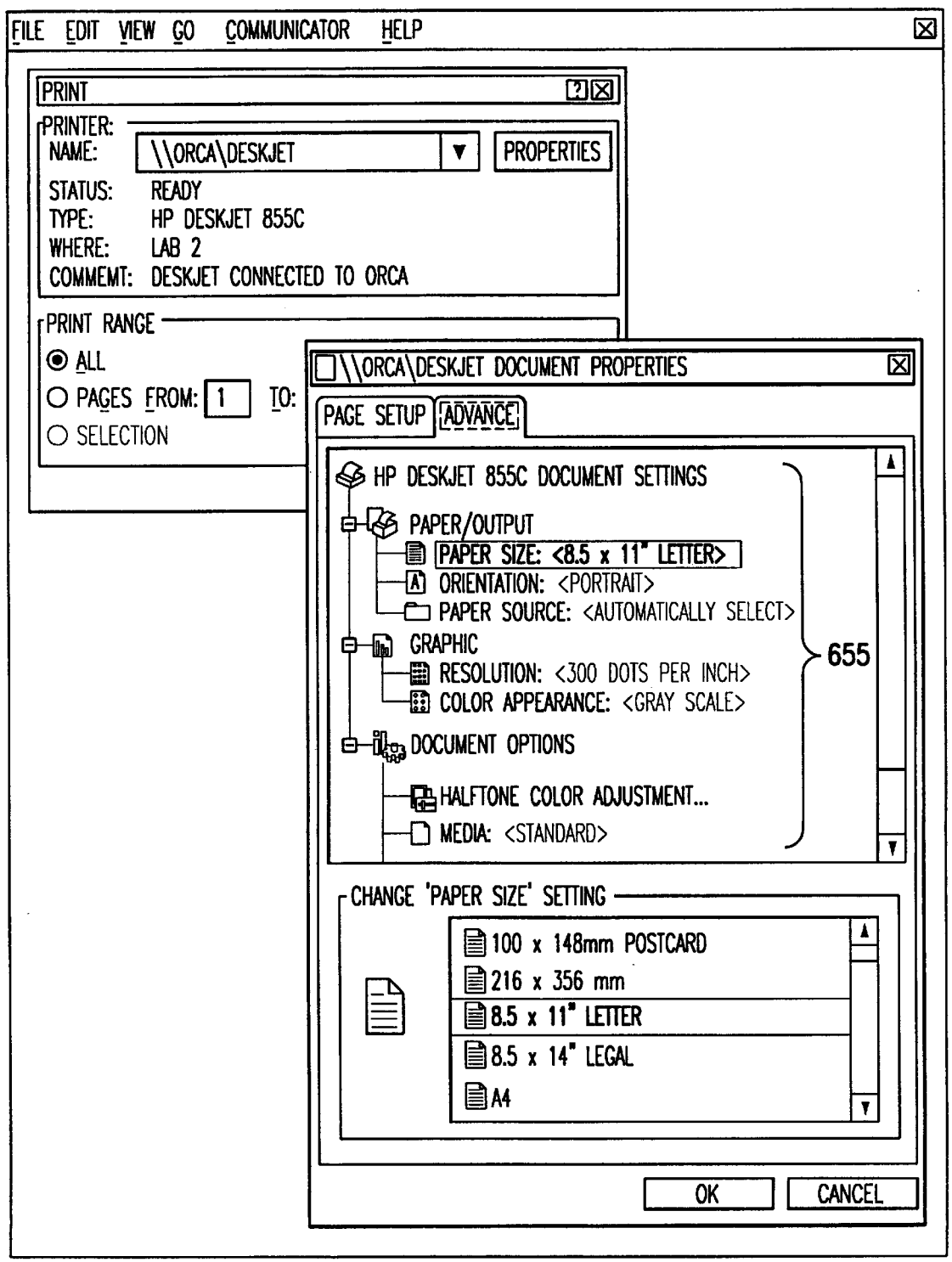
FIG. 7 shows an exemplary dialog box.
Figure 8:
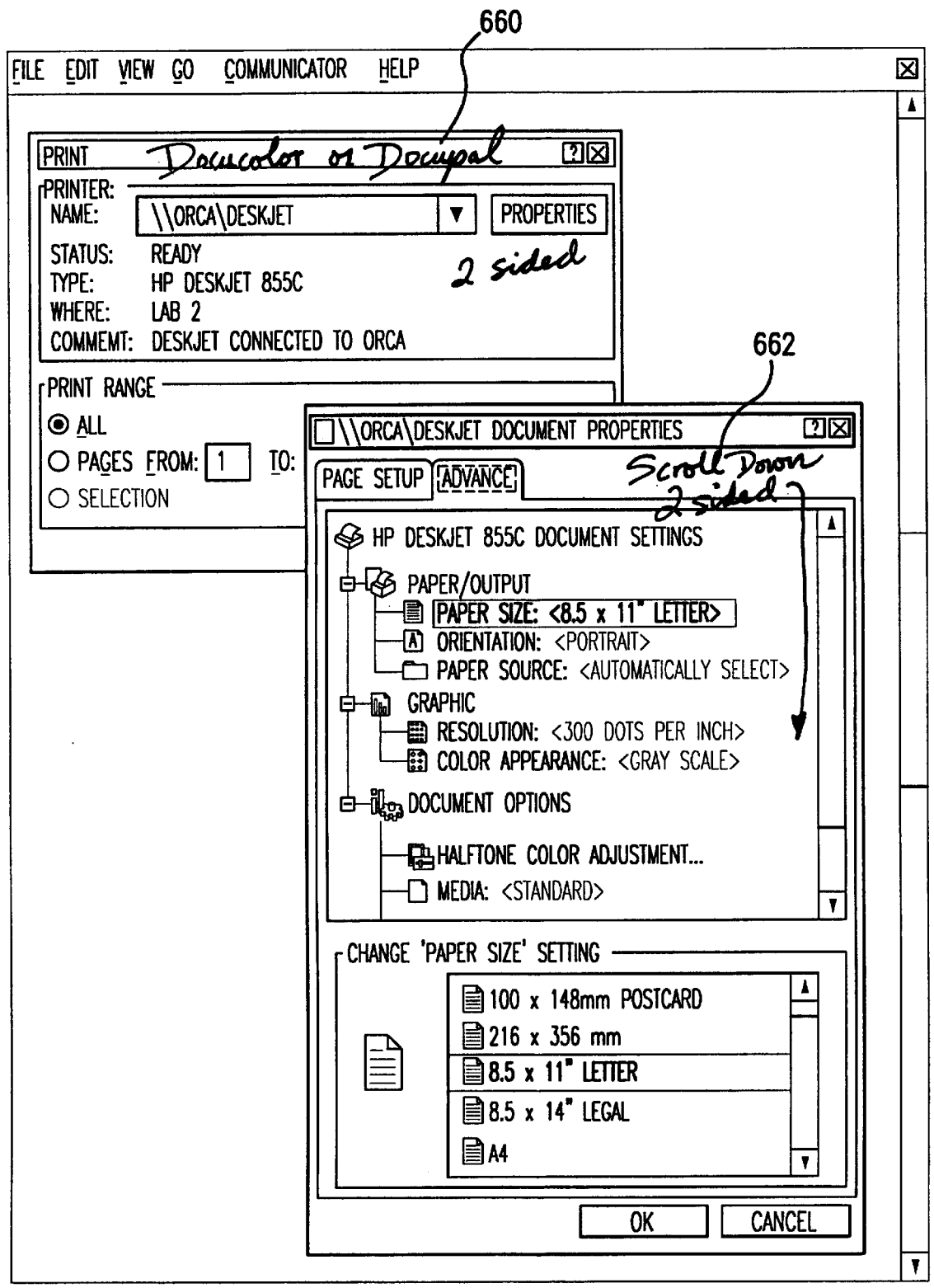
FIG. 8 shows an exemplary annotated dialog box corresponding to the dialog box shown in FIG. 7.

As previously mentioned, the methods and systems of this invention allow for annotating widgets themselves, rather than for annotating the data the widgets contain. This is illustrated with reference to FIG. 7–10. FIG. 7 shows a print dialog box for a particular printer. The displayed data 655 corresponds to the particular selected printer. FIG. 8 shows annotations 660 and 662 that have been made to the print dialog box of FIG. 7.

Figure 9:
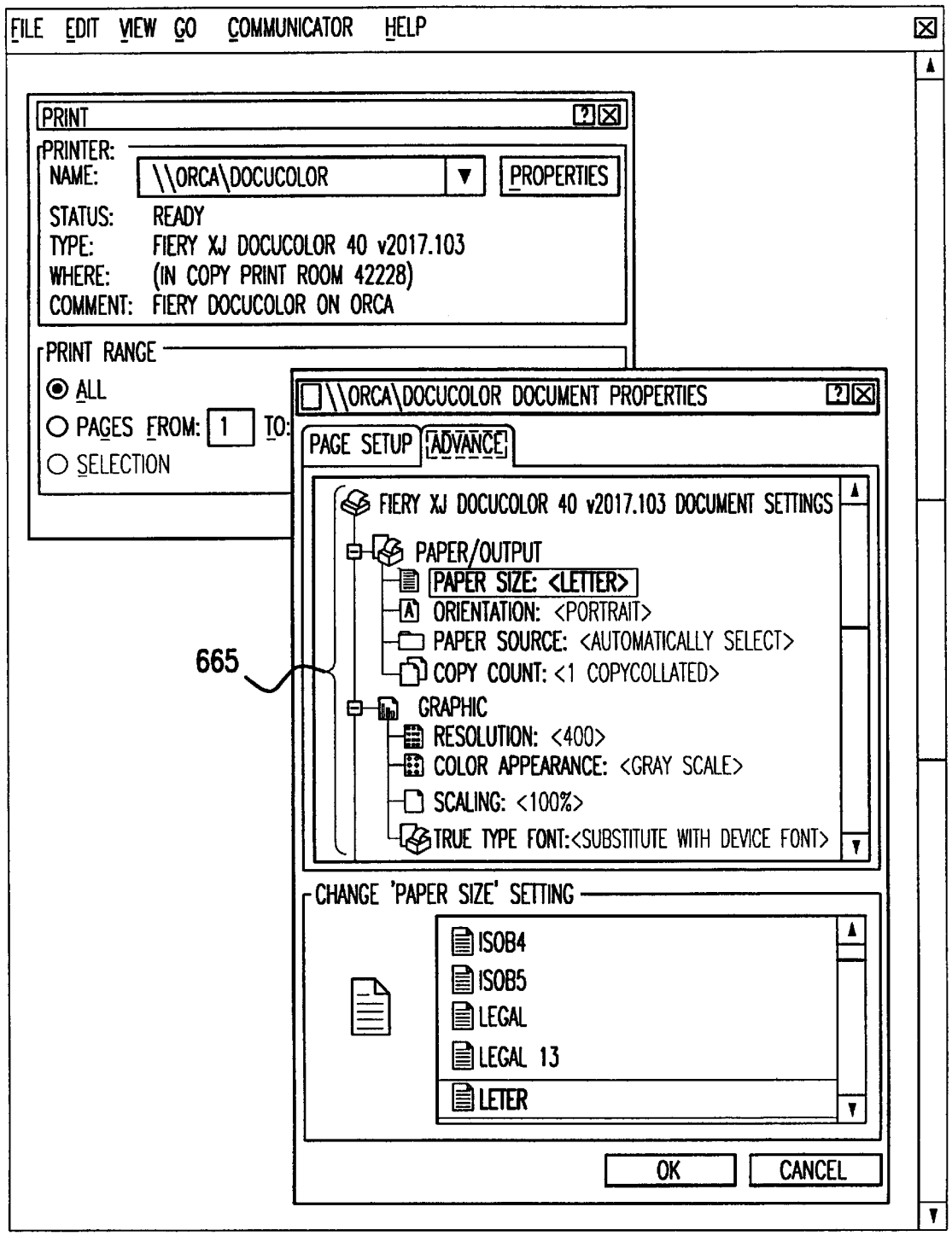
FIG. 9 shows a second exemplary dialog box.
Figure 10:
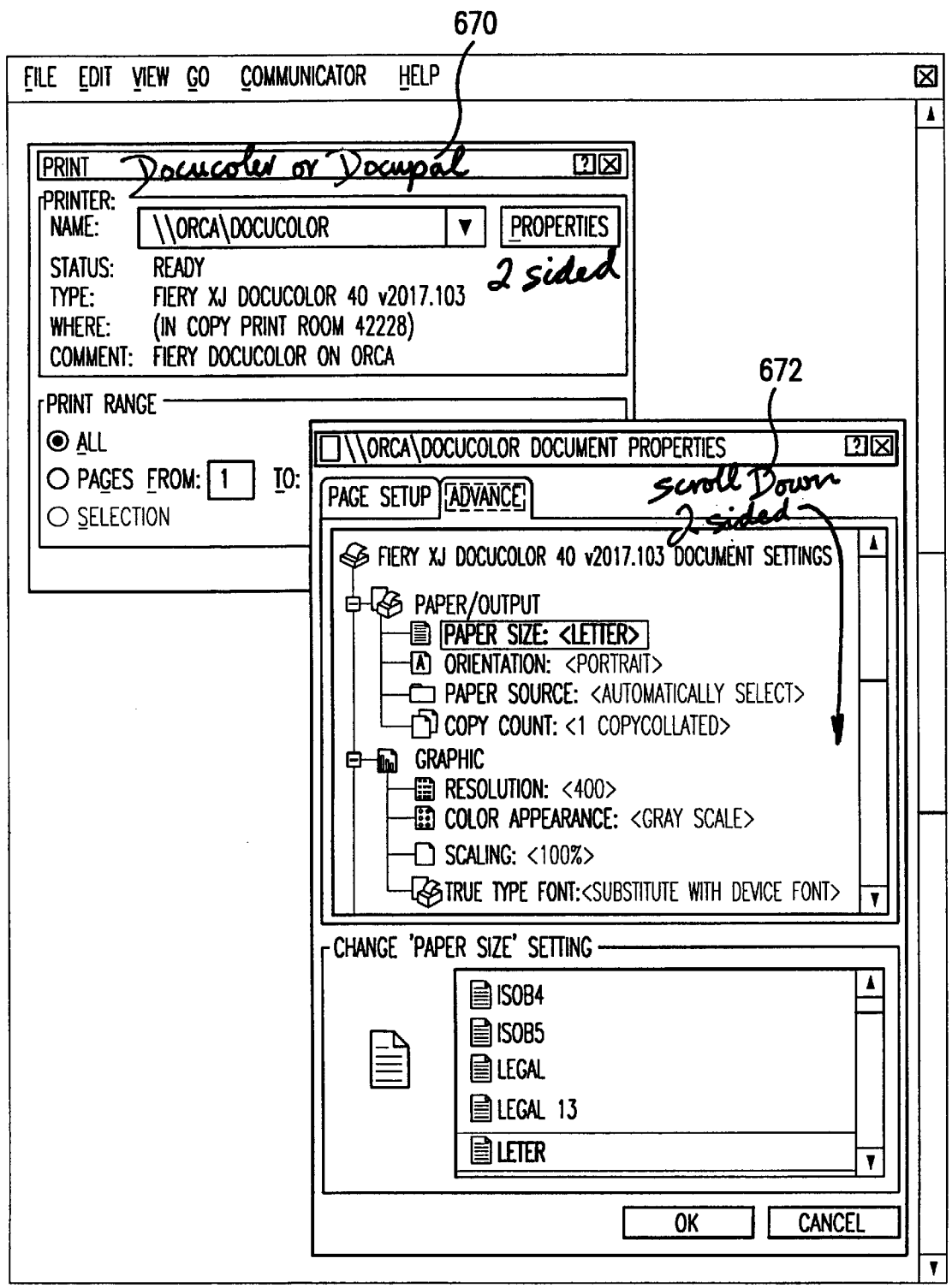
FIG. 10 shows a second exemplary annotated dialog box corresponding to the dialog box shown in FIG. 9.

FIG. 9 shows the same print dialog box for another printer. The displayed data 665 corresponds to this second selected printer. FIG. 10 shows the same annotations 670 and 672 that have been made to the print dialog boxes of FIGS. 8 and 9.

Figure 11:
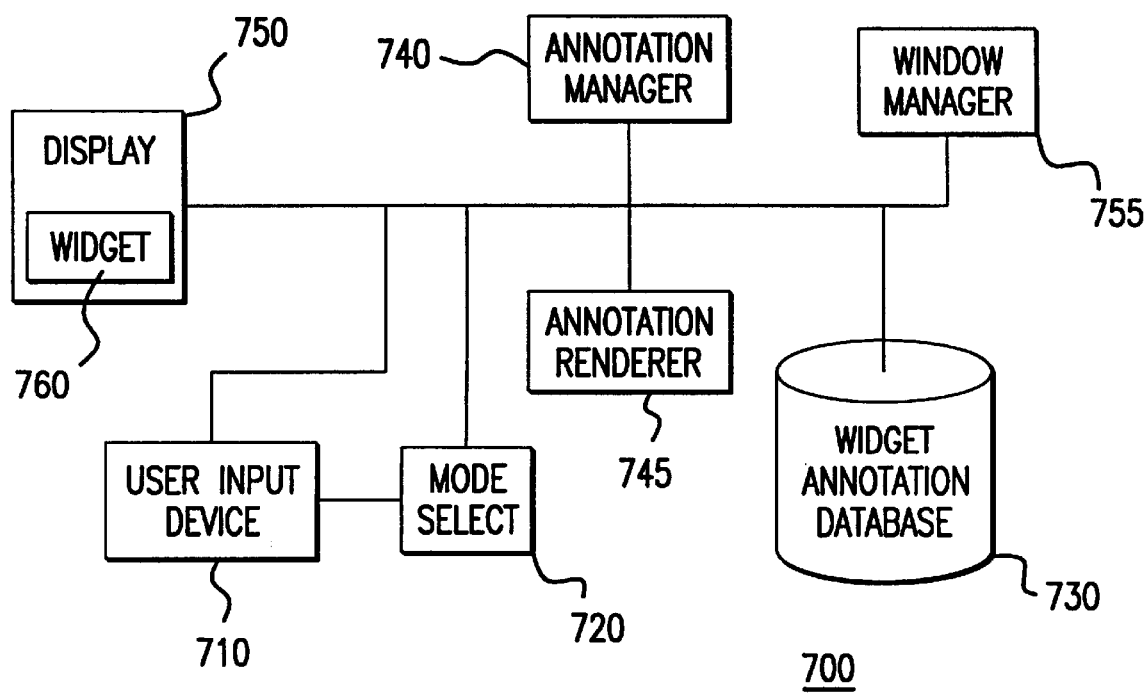
FIG. 11 shows one exemplary embodiment of a functional block diagram of a system for annotating widgets according to this invention.

FIG. 11 is a functional block diagram illustrating one embodiment of a widget annotation system 700 according to this invention. As shown in FIG. 11, the widget annotation system 700 comprises a user input device 710, such as a mouse, pen or a keyboard, a mode selector 720, a widget annotation database 730, an annotation manager 740, an annotation renderer 745, a display 750 that displays a widget 760 to be, or that has been, annotated, and a window manager 755.

A user, through the user input device 710, interacts with the system 700 to annotate the widget 760. The annotation manager 740 monitors annotations made to the widget 760. Once an annotation is made, the annotation manager 740 saves the annotation information with the associated unique widget identifier in the widget annotation database 730. Upon a subsequent display of the same widget 760, the annotation manager 740 accesses the annotations, if any, from the widget annotation database 730, and the annotation renderer 745 displays the annotations.

The widget annotation database 730 stores unique widget identifiers with corresponding annotations. The unique widget identifier as used in this application comprises an application identifier, a widget identifier and an optional user identifier. The application identifier identifies a window manager or an application. The widget identifier comprises a static resource identifier and/or an identifier maintained dynamically by an application or window manager. The optional user identifier uniquely identifies a user of a system.

The mode selector 720 controls the type of annotation mode selected by the user. The display 750 can be a monitor or other comparable display device that is capable of displaying widgets 760.

Figure 12:
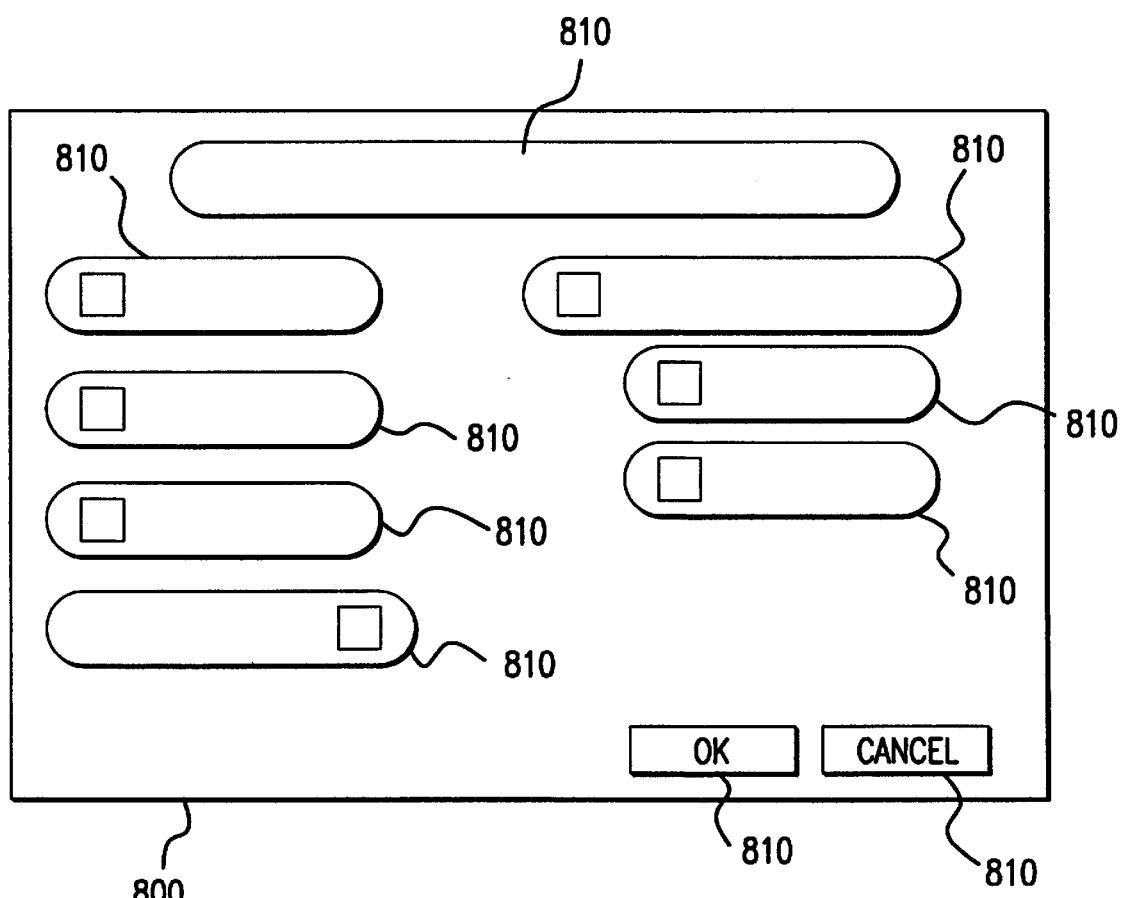
FIG. 12 is an exemplary structural block diagram of a window.

FIG. 12 is a structural representation of an exemplary window 800. The window includes a number of widgets 810 that represent all the visual elements forming the window 800.

Figure 13:
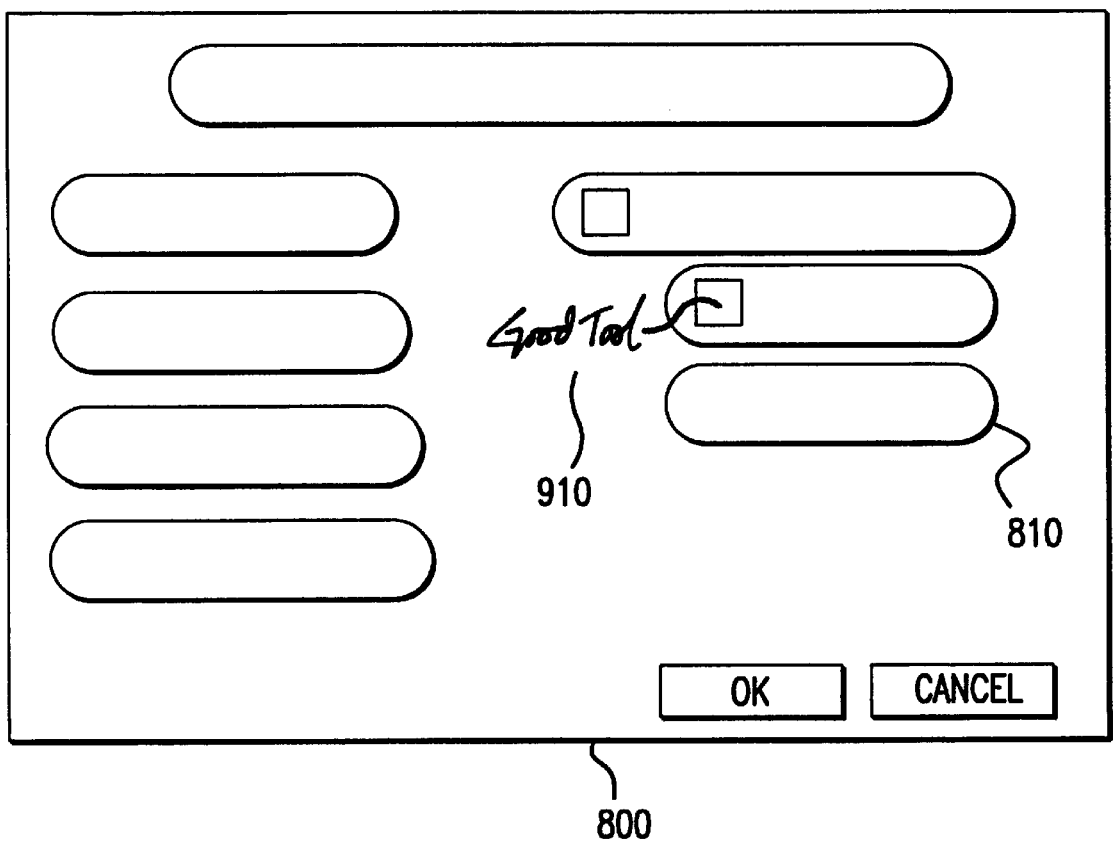
FIG. 13 is an exemplary structural block diagram of a widget annotated according to this invention.

As shown in FIG. 13, annotations 910 to the window 800 appear as annotations or markings on one or more of the individual widgets 810. These annotations or markings 910 do not alter the widget itself, but rather are "layered" over the assemblage of widgets 810 that form the window 800.

Figure 14:
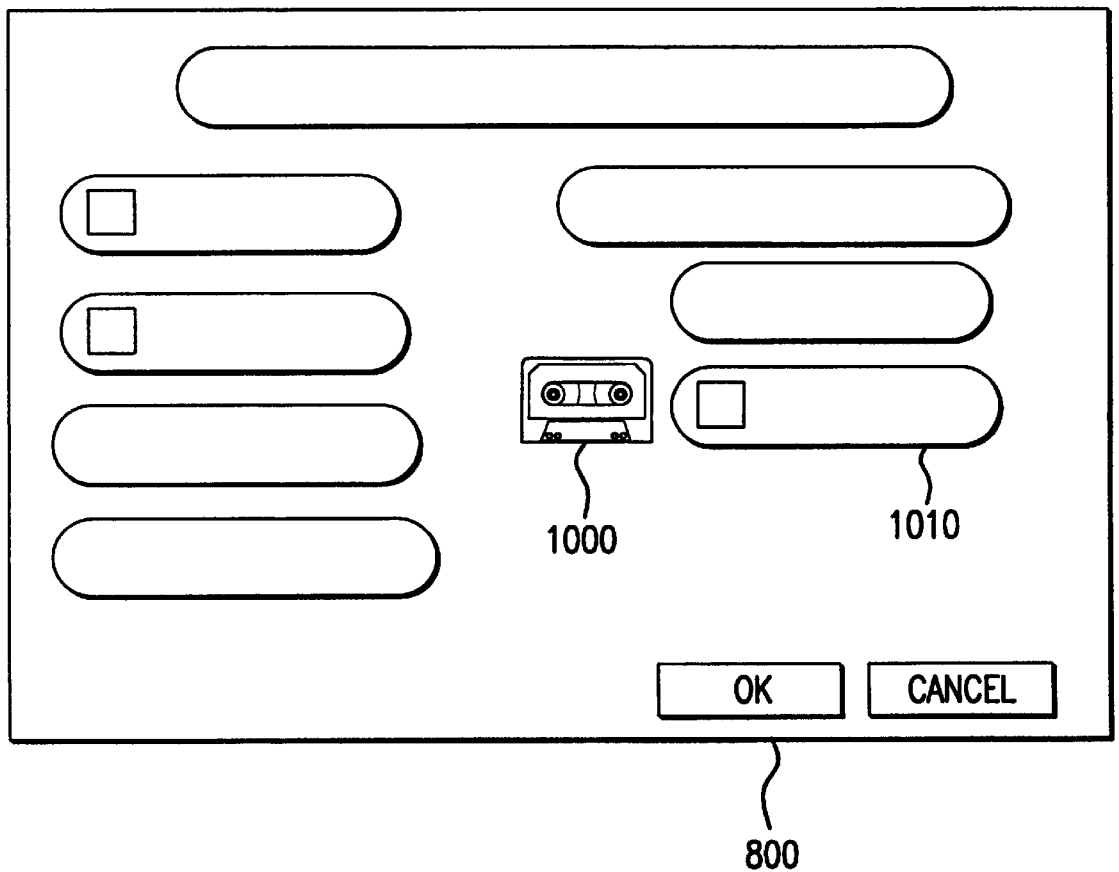
FIG. 14 shows an audio annotation added to a widget according to this invention.
Figure 15:
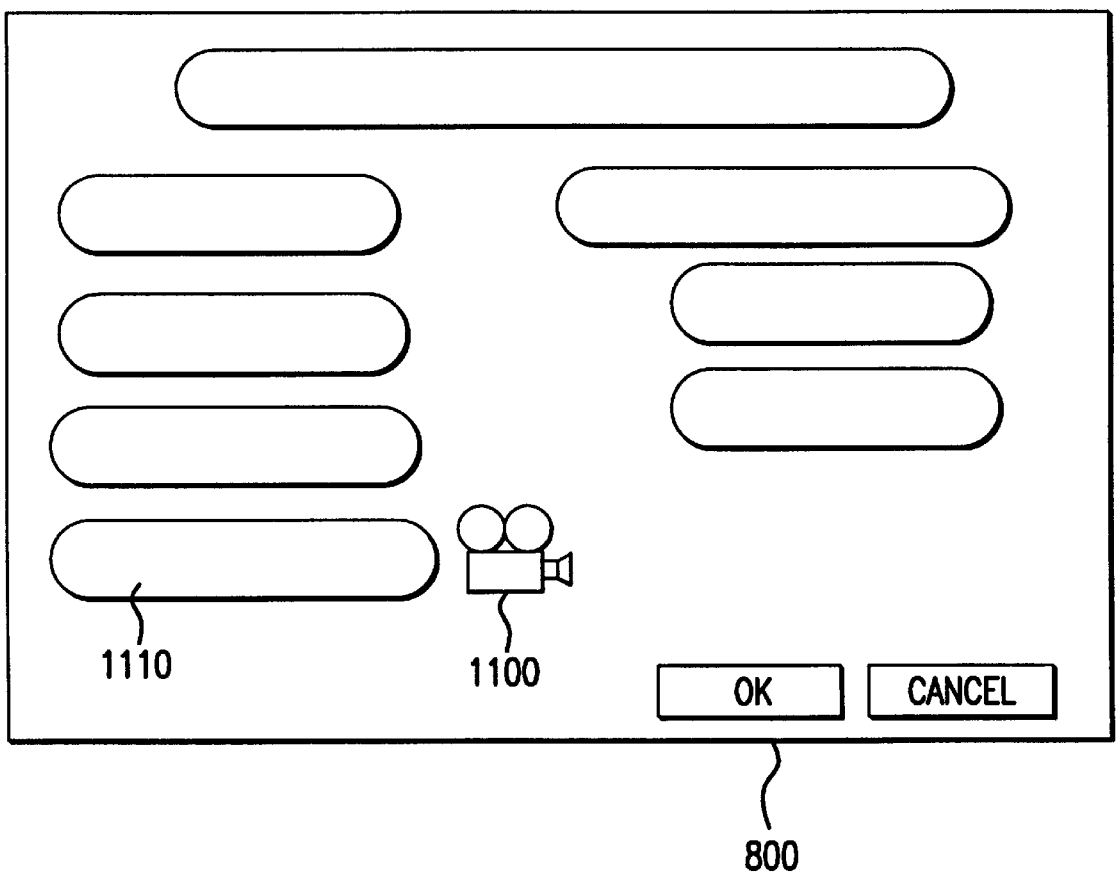
FIG. 15 shows a video annotation added to a widget according to this invention.

FIGS. 14 and 15 illustrate additional exemplary types of annotations that can be added to a widget according to this invention. For example, the window 800 shown in FIG. 14 contains an icon 1000 representing an audio segment added or attached to a widget 1010 within the window 800. As with freeform ink annotations, the icon 1000 is displayed in conjunction with the associated annotated widget. However, in addition to the visual content associated with the icon itself, the icon represents a link, such as a hyperlink or pointer, to an audio file. This audio file may be a preexisting audio file, such as a "wav" file. Alternatively, the audio file could be recorded by a user specifically for the current annotation. For example, when a user decides to annotate a widget, the user could be prompted for the type of annotation desired. If the user selects "audio annotation," for example, the system could record the user's audio clip or prompt the user for an already existing audio clip file.

During playback, the user simply selects the icon 1000, for example with a mouse click. In response, an audio clip is played to the user relating to the content of the widget 1010 to which the icon 1000 has been associated. FIG. 15 illustrates a video icon 1100 associated with a widget 1110. As with audio annotations, video annotations can be recorded or replayed when the user indicates a video or multimedia annotation is desired, or selects the video icon 1100, respectively.

Figure 16:
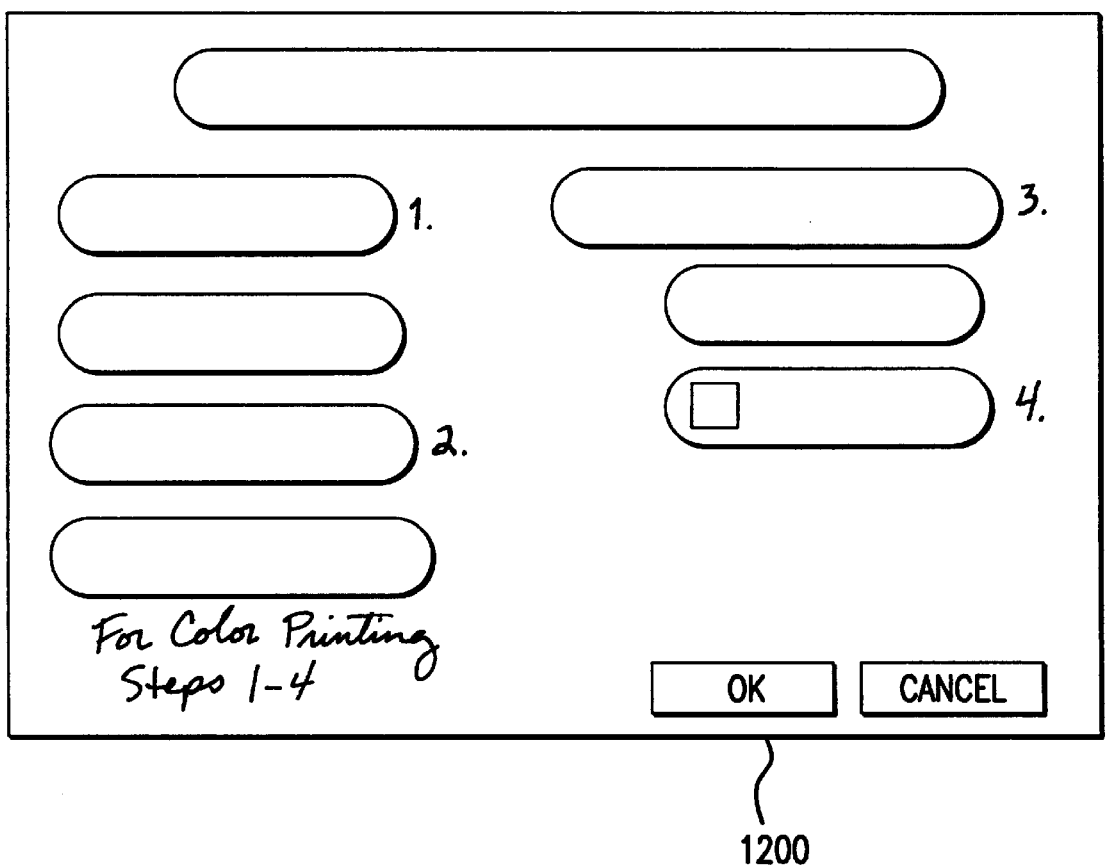
FIG. 16 is a third exemplary annotated widget annotated according to this invention.

FIG. 16 is another exemplary annotated window 1200, illustrating that annotations are not limited to one particular widget, but can be strewn throughout the entire window.

In operation, a user selects the mode in which annotations are to be performed. For example, one mode can be activated by simply inking over the nonactive portions of the window. Alternatively, if annotations are desired within an active element, a user can temporarily enter a manual mode which would disable the active components of the window and allow annotations to be placed anywhere within the window.

In either of these modes, the annotations are recorded identically in the widget annotation database. For example, in automatic mode, if the annotation, e.g., inking process, event occurs over an active widget, i.e., a radio button, no annotation, e.g., ink mark, is made. If a selection device controlled by the user, e.g., a mouse pointer, passes over an active widget, e.g., a radio button, that active widget performs normally. Alternatively, if no widget responds to the annotation event, an annotation mode can be triggered.

A second exemplary embodiment of the methods according to this invention includes an annotation button in the application environment. When the button is selected, the widgets are disabled, the cursor optionally changes to indicate the annotation mode, and user-selected events produce annotations.

Digital ink can be used to embody the user's annotations. For example, the freeform digital ink can be used to highlight text or to actually change the characteristics of the text, e.g., underlining. Furthermore, annotations is not limited to actual written annotations by the user. The annotations may encompass audio or video data, animated graphics, and/or may be either transparent or opaque, depending on the user's desire. Furthermore, it should be understood that the annotations to the widget need not be static. Active elements or hyperlinks can also be included to further broaden the usefulness of the annotations.

All annotations to the widget are stored in the widget annotation database 730. This widget annotation database 730 need not be integral to one particular user's application and one particular user's annotations. By storing the unique widget identifiers, the widget annotation database 730 can be shared with other users so they can use a first user's annotations. The receiving user can preview and/or ignore the previous annotations, can replace the existing annotations with the new annotations, and/or add new annotations, or merge the two sets of annotations.

Figure 17:
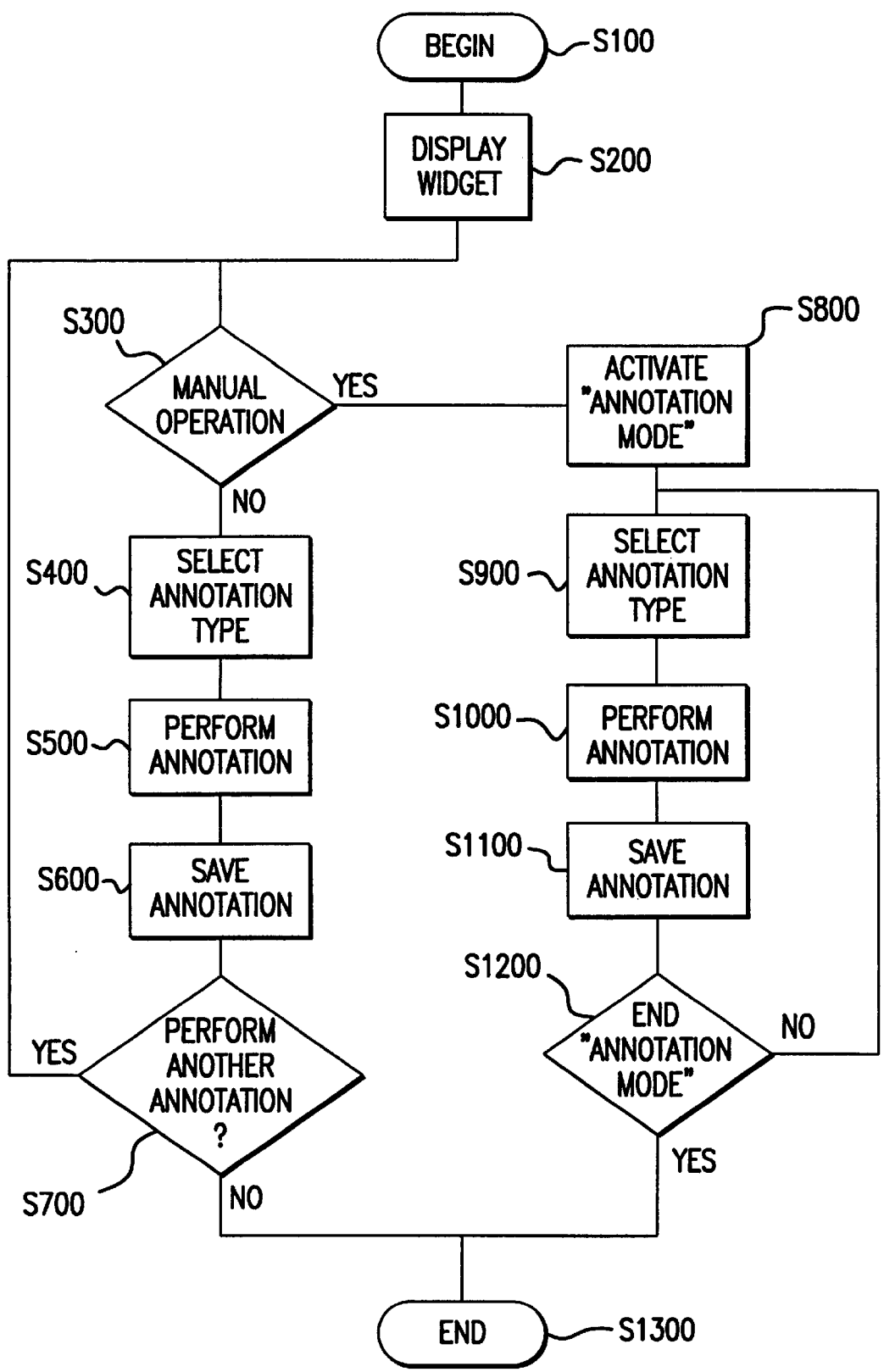
FIG. 17 is a flowchart outlining one exemplary method for annotating a widget according to this invention.

FIG. 17 is a flowchart outlining one exemplary method for annotating a widget according to this invention. Control begins in step S100, and then continues to step S200, where a widget is displayed. With the widget displayed, a user has the option of annotating the widget. Thus, in step S300, a user determines whether automatic or manual annotation is desired. If automatic operation is desired, control continues to step S400. Otherwise, if manual annotation is desired, control jumps to step S800.

In step S400, the particular annotation type desired is selected. This can range, for example, from font attributes, to text attributes, to line thickness and/or color, to insertion of audio or video elements, plain text, highlighting or other type of freeform digital ink. Then, in step S500, the actual annotations are created and added by the user relative to the widget. Next, in step S600, the added annotations are associated with the widget and saved. Control then continues to step S700.

In step S700, the user is queried whether another annotation is desired. If another annotation is desired, control jumps back to step S300. If no further annotations are desired, control continues to step S1300, where the control sequence ends.

In step S800, the manual annotation mode is activated. This manual annotation mode allows user complete control over the type and placement of the annotations. Next, in step S900, as with step S400, the user selects the annotation type. Then, in step S1000, the user creates and adds the annotation relative to the widget. Control then continues to step S1100.

In step S1100, the annotations are associated with the corresponding widgets and are saved. Then, in step S1200, the user determines if additional annotations are desired. If so, control jumps back to step S900. Otherwise, control continues to step S1300 where the control routine ends.

Figure 18:
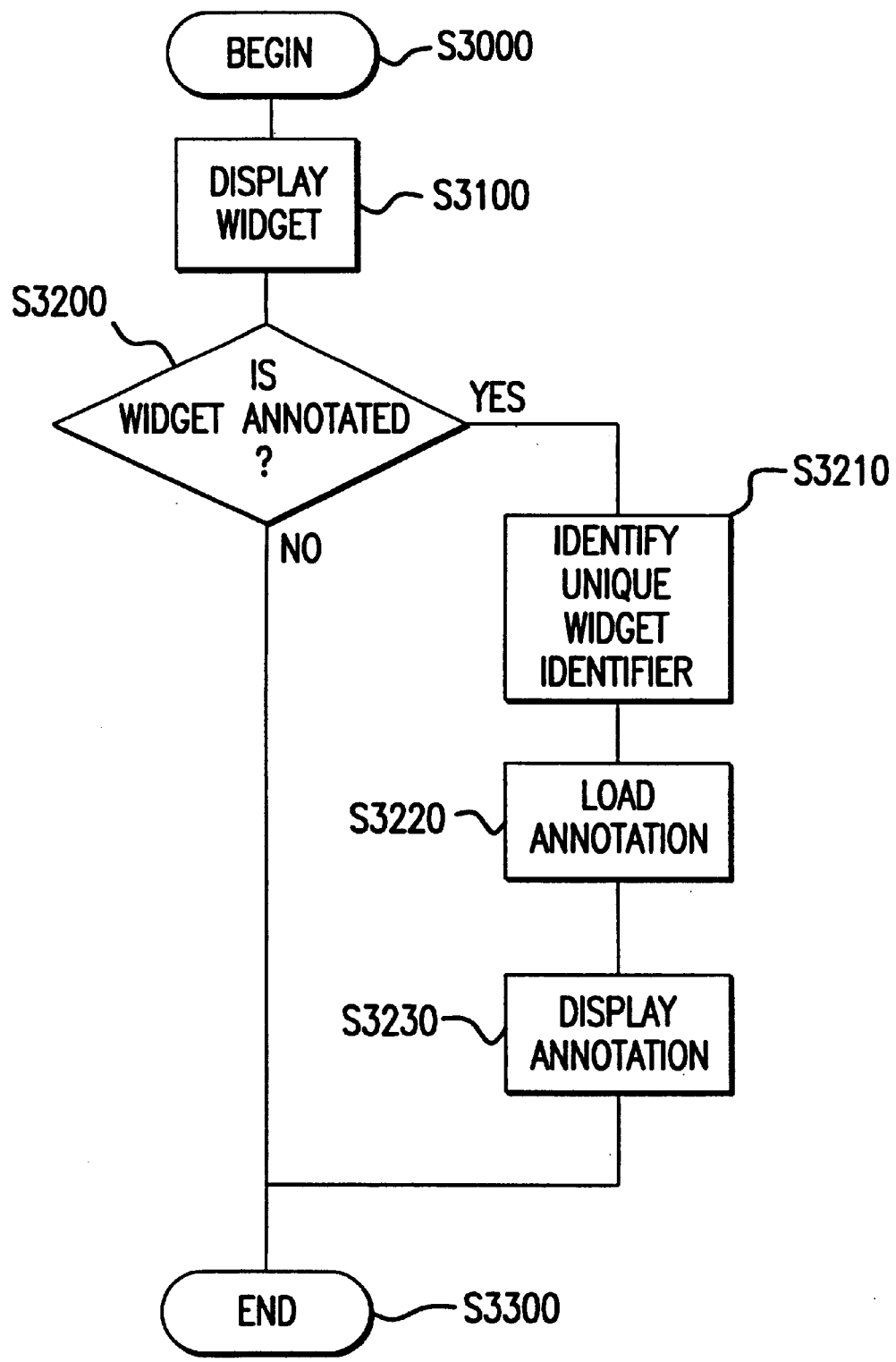
FIG. 18 is a flowchart outlining another exemplary method for displaying an annotated widget according to this invention.

FIG. 18 is a flowchart outlining one exemplary embodiment of a method for displaying an annotated widget according to this invention. Control begins in step S3000, and then continues to step S3100, where a widget is displayed. Then, in step S3200, a determination is made as to whether the displayed widget is annotated. If the displayed widget is annotated, control jumps to step S3210 Otherwise, control continues to step S3300. In step S3300, the control sequence ends.

In step S3210, the unique widget identifier is determined. Next, in step S3220, the corresponding annotation is loaded. Then, in step S3230, the annotation is displayed. Control then passes to step S3300, where the control sequence ends.

As shown in FIG. 11, the widget annotation system is preferably implemented on one or more programmed general purpose computers. However, the widget annotation system can also be implemented on a special purpose computer, a programmed microprocessor or microcontroller and peripheral integrated circuit elements, an ASIC or other integrated circuit, a digital single processor, a hardwired electronic or logic circuit such as a discrete circuit, a programmable logic device such as a PLD, PLA, PGA, FPGA or PAL, or the like. In general, any device, capable of implementing a finite state machine that is in turn capable of implementing the flowcharts shown in FIGS. 17–19, can be used to implement the widget annotation system according to this invention.

It is, therefore, apparent that there have been provided in accordance with the present invention, methods and systems for annotating widgets. While this invention has been described in conjunction with preferred embodiments thereof, it is evident that many alternatives, modifications, and variations be apparent to those skilled in the art. Accordingly, applicants intend to embrace all such alternatives, modifications and variations that fall within the spirit and scope of this invention.

What is claimed is:

1. A method for annotating an existing widget control within a window comprising:

enabling an annotation mode that allows at least one annotation that is displayable transparently layered on a user interface of the existing widget control within a window to be made relative to that widget control within a window; and associating the at least one annotation with that widget control within a window.

2. The method of claim 1, wherein the annotations remain associated with the widget control within a window even if information within the widget control within a window changes.

3. The method of claim 1, further comprising:
determining a location of a cursor relative to the at least one widget control within a window; and enabling an annotation mode based on the determined location.

4. The method of claim 3, wherein the annotation mode is activated if the cursor is located in a non-active portion of the at least one widget control within a window.

5. The method of claim 3, wherein the annotation mode is deactivated if the cursor is located in an active portion of the at least one widget control within a window.

6. The method of claim 1, wherein associating the at least one annotation with the widget control within a window comprises associating a unique widget identifier, which comprises an application identifier, with the at least one annotation.

7. The method of claim 1, wherein associating the at least one annotation with the widget control within a window comprises associating a unique widget identifier, which comprises a widget identifier, with the at least one annotation.

8. The method of claim 1, wherein associating the at least one annotation with the widget control within a window comprises associating a unique widget identifier, which comprises a user identifier, with the at least one annotation.

9. The method of claim 1, wherein the at least one annotation remains with the corresponding widget control within a window after an application is closed.

10. The method of claim 1, wherein the at least one annotation does not remain with the corresponding widget control within a window after an application is closed.

11. A method for displaying an existing widget control within a window, comprising:
identifying at least one annotation transparently layered on a user interface associated with the widget control within a window that is to be displayed with the widget control within a window; and
displaying the widget control within a window and the at least one associated annotation.

12. The method of claim 11, further comprising updating data within the widget control within a window.

13. The method of claim 11, wherein identifying the at least one associated annotation comprises:
reading at least one unique widget identifier; and
reading at least one corresponding annotation.

14. The method of claim 13, wherein reading the at least one unique widget identifier comprises reading at least one application identifier.

15. The method of claim 13, wherein reading the at least one unique widget identifier comprises reading at least one resource identifier.

16. The method of claim 13, wherein reading the at least one unique widget identifier comprises reading at least one user identifier.

17. An existing widget control within a window annotation system, comprising:
an input device that receives at least one annotation transparently layered on a user interface for at least one widget control within a window; and
a widget annotation database that stores the at least one annotation associated with the at least one widget control within a window.

18. The system of claim 17, further comprising a mode selector that sets an annotation mode.

19. The system of claim 18, wherein the annotation mode is determined by a location of a cursor relative to the at least one displayed widget control within a window.

20. The system of claim 17, wherein the widget annotation database stores at least one unique widget identifier with at least one corresponding annotation.

21. The method of claim 20, wherein the at least one unique widget identifier comprises at least one application identifier.

22. The method of claim 20, wherein the at least one unique widget identifier comprises at least one resource identifier.

23. The method of claim 20, wherein the at least one unique widget identifier comprises at least one user identifier.

24. The system of claim 17, further comprising a widget display device on which the at least one widget control within a window is displayed.

25. A system that renders annotations associated with an existing widget control within a window, comprising:
a widget annotation database that stores at least one annotation transparently layered on a user interface associated with at least one widget control within a window; and
a widget display device that displays the widget control within a window to be displayed and the at least one associated annotation.

26. The system of claim 25, wherein an application updates information in the widget control within a window to be displayed.

27. The system of claim 25, wherein an annotation renderer displays the widget control within a window to be displayed prior to displaying the at least one associated annotation.

28. The system of claim 25, wherein an annotation renderer simultaneously controls display of the at least one associated annotation and the widget control within a window to be displayed.

29. The system of claim 25, wherein an annotation renderer displays the annotation to be displayed after an annotation manager accesses the at least one associated annotation from the widget annotation database.

* * * * *